United States Patent
Van De Steeg et al.

[11] Patent Number: 6,102,053
[45] Date of Patent: Aug. 15, 2000

[54] PROCESS FOR SEPARATING RADIOACTIVE AND HAZARDOUS METAL CONTAMINANTS FROM SOILS

[75] Inventors: Garet E. Van De Steeg, Oklahoma City; L. Keith Bailey, Edmond, both of Okla.

[73] Assignee: Kerr-McGee Chemical LLC, Oklahoma City, Okla.

[21] Appl. No.: 09/131,259

[22] Filed: Aug. 7, 1998

Related U.S. Application Data

[63] Continuation-in-part of application No. 08/890,184, Jul. 9, 1997, abandoned, which is a continuation-in-part of application No. 08/639,540, Apr. 29, 1996, abandoned.

[51] Int. Cl.[7] ................................................. B08B 9/20
[52] U.S. Cl. ........................ 134/25.1; 134/13; 134/18
[58] Field of Search ........................... 134/25.1, 10, 13, 134/18; 209/2, 18, 589, 555, 571, 576

[56] References Cited

U.S. PATENT DOCUMENTS

| | | | |
|---|---|---|---|
| 1,728,196 | 9/1929 | Blatch | 209/496 |
| 2,963,155 | 12/1960 | Peterson et al. | 209/457 |
| 3,572,500 | 3/1971 | Kouloheris | 209/5 |
| 3,653,505 | 4/1972 | Phippen | 209/44 |
| 4,128,474 | 12/1978 | Ennis | 209/2 |
| 4,231,478 | 11/1980 | Stone | 209/576 |
| 4,646,978 | 3/1987 | Johnson et al. | 241/24 |
| 4,783,253 | 11/1988 | Ayres et al. | 209/2 |
| 5,238,119 | 8/1993 | Simon et al. | 209/166 |
| 5,268,128 | 12/1993 | Lahoda et al. | 252/626 |
| 5,316,223 | 5/1994 | Lahoda et al. | 241/24 |
| 5,434,332 | 7/1995 | Cash | 588/1 |

*Primary Examiner*—Zeinab El-Arini
*Attorney, Agent, or Firm*—C. Clark Dougherty, Jr.

[57] ABSTRACT

A process for treating radioactive contaminated soils to remove radioactive contaminants therefrom includes creating a suspension of particles of the soil in water, and directing the slurry to a particle size separator. The small particles including radioactive contaminants are collected and handled for radioactive waste material storage. The aqueous slurry of large soil particles is directed to separators for removing substantial amounts of water after which the particles are directed to a conveyor and spread out to a substantially uniform thickness and detected for any radioactivity. Portions of material in which radioactive particles are detected are diverted and the uncontaminated soil material is recovered.

11 Claims, 1 Drawing Sheet

PROCESS FOR SEPARATING RADIOACTIVE AND HAZARDOUS METAL CONTAMINANTS FROM SOILS

This is a continuation-in-part of co-pending application Ser. No. 08/890,184, filed Jul. 9, 1997, now abandoned, which is a continuation-in-part of co-pending application Ser. No. 08/639,540, filed Apr. 29, 1996, and now abandoned.

BACKGROUND OF THE INVENTION

A rather large amount of radioactive soil has accumulated in areas where nuclear processing has been carried out over the years. Because of the great volume of such radioactive soils, handling, transportation and storage problems and costs are substantial. In other locations large amounts of soils containing hazardous metals such as lead, mercury, silver, arsenic, cadmium and chromium often result in unusable land masses of such great volumes that the cost of disposal is economically impractical, if not prohibitive.

SUMMARY OF THE INVENTION

It has been found, according to the present invention, that the hazardous or radioactive components of contaminated soils can be removed by creating a suspension of the soil particles. The portion of the soil containing the coarse generally uncontaminated material is then inspected by radioactive detection means, the contaminated soil portions are separated and the uncontaminated soil is recovered.

DETAILED DESCRIPTION OF THE INVENTION

Figure 1:
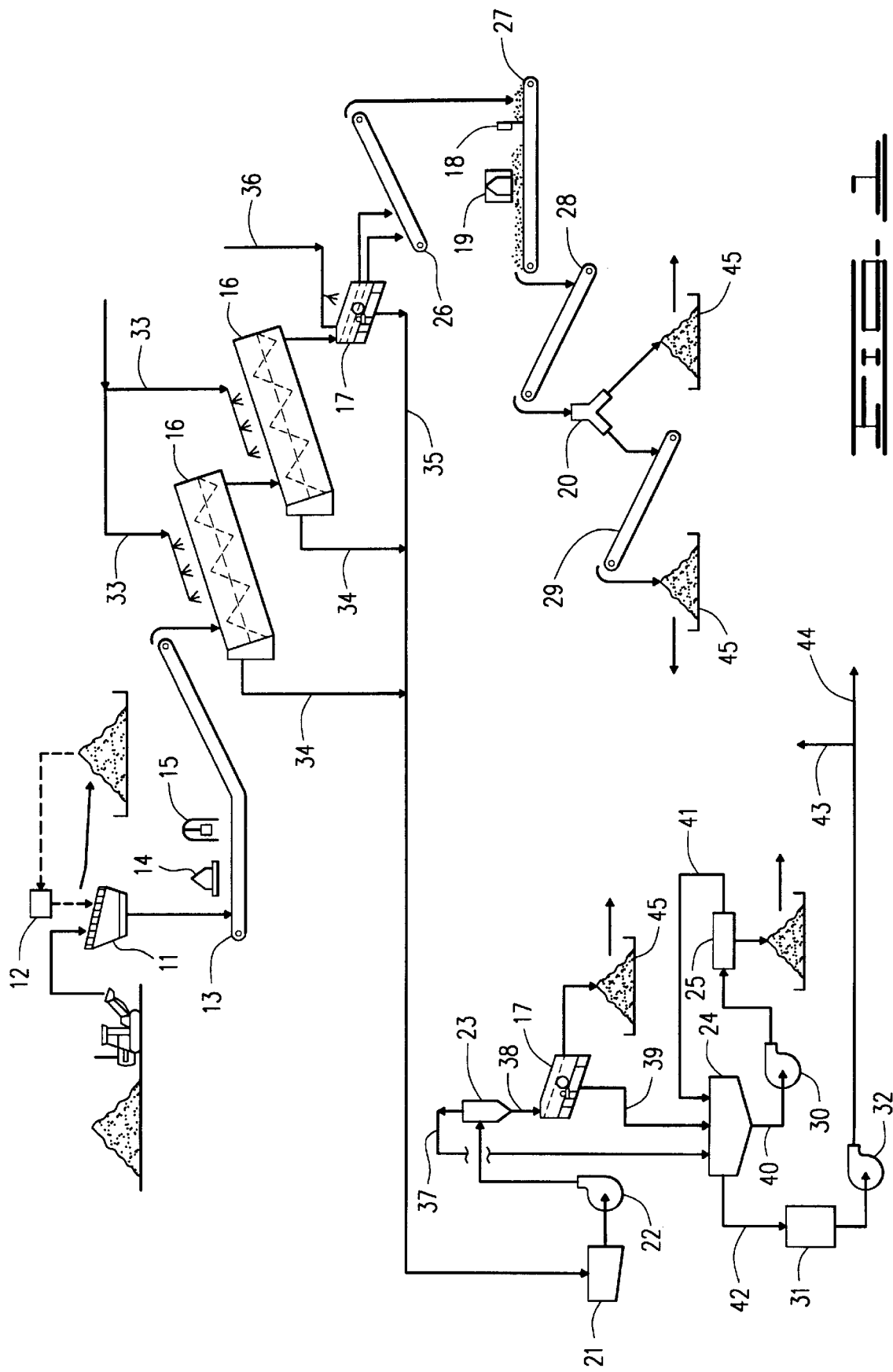
FIG. 1 is illustrative of components and processes useful in carrying out the present invention.

In treating soils according to the process of the invention, the apparatus and processes shown in the figures are useful. The radioactive materials are usually present as metal compounds. Soil containing the contaminants is placed in a hopper or similar chute using a loader or other convenient means. The material is directed to a sizing apparatus such as a vibrating screen which separates smaller particles from larger particles, the latter passing to a crusher. Any other means for separating out particles too large to be conveniently handled in the subsequent process may be used, and that shown is by way of illustration only. The sizing apparatus conveniently passes soil particles of 4 inch while larger particles or "overs" are directed to the crusher for crushing the particles to a nominal size no larger than about 4 inch diameter. A conveyer then moves the material to an apparatus for separating large and small particles. Optionally, at a convenient location, prior to being introduced into the separation phase of the system, radioactively contaminated soil may be inspected with a radiation detector to provide an indication of the level of contamination. Such detection may also be useful in rating the effectiveness of the process by comparing the radioactive level obtained subsequently in the process. For this purpose a detector is shown above the conveyor, although such detection equipment may be placed at any location upstream of the jig.

Referring to FIG. 1, feed hopper 11, optionally with a grizzly, presorts and screens contaminated feed soil to remove large (advantageously 5 inches and larger, preferably 4 inches and larger) rocks, debris, and the like. Feed hopper 11 can have a stationary screen or advantageously a vibratory-type screen. The hydraulically-actuated cylinder for lifting the screen to dump accumulated oversize rocks, debris, etc., may also be used. Optional crusher 12 may be used to reduce the size of the separated oversize fraction to permit processing of such material and thereby prevent or minimize possible damage to downstream processing equipment. The crusher could be used batchwise or continuously and would advantageously be of the roller type, gyratory type, hammermill type, and the like. The material fed into hopper 11 could be processed through crusher 12 and/or the oversize material from hopper 11 could be recirculated through crusher 12 thereby essentially processing all of the material available.

The material from hopper 11 is deposited on conveyor 13 which transports the solids to soil washer/scrubber 16. Conveyor 13 optionally transports the material near tramp iron magnet 14 to remove pieces of scrap iron and other magnetic metals and near metal detector 15 to remove non-magnetic metals.

The purpose of soil washer/scrubber 16 is to remove any clay coating contaminates from the coarse material, remove any encrusted contaminated layers or particles (other than clay) from the coarse material, break up any mudballs and any clay balls (both of which are comprised of smaller contaminated particles), and provide limited abrading of particle surfaces. Soil washer/scrubber 16 can be any of the following types: pugmill, logwasher, paddle mixer, trommel, and the like. The preferred retention time for the solids within soil washer/scrubber 16 is from about 1 minute to about 15 minutes. Advantageously soil washer/scrubber 16 has the capability of operating at from about 30 to about 80 percent by weight solids concentration. Although FIG. 1 depicts two soil washer/scrubbers 16, the present invention contemplates the use of one or more such soil washer/scrubbers. Advantageously the washer/scrubbed presents an upwardly incline or slope through which the material must traverse. Advantageously the course particles are reduced in size by about 10% or less by washer/scrubber 16.

The washed/scrubbed solids from washer/scrubber 16 is passed to wet screen 17 which dewaters washed soil solids to an acceptable water content, effects solid separation based upon particle size and rinses contaminated materials from the surface of soil solvents. Wet screen 17 can be single or multiple deck screens. When using a multiple deck screen, the top deck functions as a scalping deck. The screen openings are dependent upon the type soils being separated and the remaining steps of the process revised. Wet screen 17 can be wire mesh or slotted in decks with a portion of the deck optionally utilizing a vacuum assist. The soil separated by wet screen 17 is deposited upon leveling device 18 which provides a substantially uniform thickness over conveyor 27. Advantageously leveling device 18 is variably adjustable. Advantageously, the bed height, i.e, the height of the soil on conveyor 27 is from about 4 to about 12 inches. However, a variation of up to about 20% of the bed height will not affect the performance of the process as long as such variation occurs over a relatively short time period of about 10 minutes or less. Advantageously the bed height variation is about ±2 inch, preferably about ±1 inch, and most preferably about ±½ inch.

Radionuclide detector 19 detects radio nuclides remaining in the soil and is dependent upon the radionuclides present. Detector 19 is a scintillation-based or diode-based gamma detector such as sodium iodide, germanium, etc. and determines the efficiency of the prior separation steps.

Conveyor 27 deposits the soil onto conveyor 28 which directs the soil to diverter gate 20 which diverts the flow of solids to the appropriate flow paths.

The liquid from soil washer/scrubber 16 and wet screen 17 is transferred through lines 34 and 35, respectively, to sump tank 21 which provide liquid holdup for downstream processing. Sump tank 21 may be agitated or non-agitated, with the size, shape and materials of construction determined by the process requirements. Transport device 22 transports the liquid from sump tank 21 to classifier 23 and may be any known type of pump such as centrifugal, rotary, diaphragm, plunger, and the like. Classifier 23 advantageously is a cyclone or hydro-cyclone classifier and provides effective removal of solids from the slurry pump thereto and preferably contains a particle size cutoff. The classifier may be a single classifier or a cluster arrangement and may be fabricated of metal or ceramic and be lined or unlined.

Solids concentrator 24 receives the liquid from classifier 23 and settles out solids from the liquid to provide a high solids content stream and a low solids content stream. Concentrator 24 utilizes either gravity or mechanically-assisted gravity settling, can include an incline plate or thickener type unit, and may include one or more stages in order to achieve the desired solid separation. Filter unit 25 receives the high solids content stream from solids concentrator 24 and produces the low liquid content solids cake for ease of handling. The low liquid content solids cake is preferably less than 20% by weight liquid. Filter unit 25 is of known construction such as plate/frame, rotary drum, belt, cartridge, tubular, or other commercial type filter unit.

Wash liquid, recycled or fresh, is transported through line 33 and preferably is sprayed under pressure to wash the solids in soil washer/scrubber 16 and to further segregate and convey fine-sized solids along with contamination through line 34 to sump 21 for subsequent de-watering. The liquid from wet screen 17 is transported to sump 21 through line 35. Fresh liquid wash is applied to wet screen 17 through line 36.

Cyclone 23 optionally has an overflow 37 for the finer size solids. The underflow from cyclone 23 contains concentrated solids slurry and is transported through line 38 to a screen and from the screen to solids concentrator 24 through line 39.

Line 40 having a pump 30 disposed therein transports the thickener underflow containing most of the gravity settled minor size solids from solids concentrator 24 to filter unit 25. Filtrate from filter 25 is recycled to concentrator 24 through line 41. Thickener overflow containing very low suspended solids is transported from solids concentrator 24 through line 42 into surge tank 31 and may be recycled by pump 32 as a process liquid through line 43 or as a purged liquid through line 44. Gravity drainage of liquid from solid processed soil is indicated at 45. Such liquid drainage is advantageously directed to the thickener circuit.

What is claimed is:

1. A process for treating soils for separating hazardous or radioactive metal contaminated particles from uncontaminated soil particles comprising the steps:
    (a) creating a suspension of particles of said soil in water;
    (b) directing the suspension to at least one particle size separator;
    (c) separating by particle size the smaller contaminated particles from larger particles in said suspension;
    (d) removing clay coating contaminants from the larger particles;
    (e) removing encrusted contaminated layers and particles other than clay from the larger particles;
    (f) breaking up mud balls and clay balls comprised of smaller contaminated particles;
    (g) abrading the particle surfaces;
    (h) separating water from said suspension of water and large particles to form a particulate solid soil composition comprising said large particles; and
    (i) recovering the smaller particle contaminated portion and the larger particle portion.

2. The process of claim 1 including a step of crushing soil to particles of a nominal size not larger than about 4 inch prior to creating said suspension.

3. The process of claim 1 wherein the larger particles are reduced in size by about 10% or less.

4. The process of claim 1 wherein said metal contaminated particles comprise radioactive metal oxides and wherein said step (i) includes exposing the particulate solid soil composition to radioactive detection means.

5. The process of claim 4 wherein the wet particulate soil composition recovered is directed to a conveyer and spread to a substantially uniform thickness of from about 4 to about 12 inches prior to being exposed to the radioactive detection means.

6. The process of claim 5 wherein the substantially uniform thickness is accomplished by a variable leveling device.

7. The process of claim 5 wherein the substantially uniform thickness has a variation of about ±2 inch.

8. The process of claim 7 wherein the substantially uniform thickness has a variation of about ±1 inch.

9. The process of claim 8 wherein the substantially uniform thickness has a variation of about ±½ inch.

10. The process of claim 1 wherein steps (d) through (g) are performed in an upward incline washer/scrubber through which the particles must traverse.

11. The process of claim 1 including the step of grinding or scrubbing the suspension prior to step (b) to remove contaminates from the surface of larger particles, which contaminates can be separated as small particles in step (c).

* * * * *